United States Patent [19]

Neeley

[11] 4,231,111
[45] Oct. 28, 1980

[54] MARINE CABLE LOCATION SYSTEM
[75] Inventor: Walter P. Neeley, Irving, Tex.
[73] Assignee: Mobil Oil Corporation, New York, N.Y.
[21] Appl. No.: 885,916
[22] Filed: Mar. 13, 1978
[51] Int. Cl.³ .............................................. G01V 1/38
[52] U.S. Cl. ...................... 367/19; 114/253; 343/5 EM; 367/106; 367/130
[58] Field of Search .................. 340/3 T, 7 R, 7 PC, 340/15.5 DS; 114/244, 253; 367/19, 106, 130; 343/5 EM

[56] References Cited
U.S. PATENT DOCUMENTS

| | | | |
|---|---|---|---|
| 3,840,845 | 10/1974 | Brown | 340/7 R |
| 3,953,827 | 4/1976 | Moal et al. | 340/7 R |
| 3,981,008 | 9/1976 | Mann | 343/5 EM |
| 4,068,208 | 1/1978 | Rice, Jr. et al. | 340/7 R |
| 4,086,632 | 4/1978 | Lions | 343/112 PT |

*Primary Examiner*—Stephen C. Buczinski
*Attorney, Agent, or Firm*—C. A. Huggett; William J. Scherback

[57] ABSTRACT

A marine cable location system includes a plurality of magnetic compasses located at known spaced intervals along a cable being towed by a marine vessel. These compass readings are recorded along with an onboard magnetic compass reading, an onboard gyrocompass reading, and satellite navigational information. From these recordings, the X-Y coordinates of cable compasses with respect to vessel heading are determined. These X-Y coordinates are recorded along with the vessel's position and heading on magnetic tape and a cathode-ray tube so as to provide a visual display of the cable position with respect to the vessel.

6 Claims, 5 Drawing Figures

✳ = OBSTACLE LOCATION

MARINE CABLE LOCATION SYSTEM

BACKGROUND OF THE INVENTION

This invention relates to seismic exploration and more particularly to marine exploration. In marine exploration, seismic energy is generated in the water and reflections of such energy from subsurface interfaces are detected by a linear string of detectors or hydrophones. The seismic energy sources and the detectors are towed through the water by means of cables extending from a marine vessel. Signals received by the detectors are transferred to the vessel through the cable wiring. In many instances, groups of detectors are combined to form arrays within the cable, and the signals received by each such array are combined and transferred to the vessel.

One method for determining the instantaneous position of each detector or array of detectors along the cable as the cable is towed through the water is disclosed in U.S. Pat. No. 3,953,827 to Le Moal et al. A plurality of detectors or hydrophones are distributed along a towed cable. The position of each detector is determined by the interpolation of values of the angle of the tangents to the cable with a fixed and known direction, such as magnetic north, at a plurality of measuring points. At each measuring point along the cable there is located preferably a magnetic compass. There is also provided means for coding and transmitting the measured values by means of electronic pulses to a central station. Such means includes a multiplex device. The position of each measuring point is determined by assimilating that part of the towed cable located between compasses to an arc of a circle, the length of which is known from the construction of the cable, while the angular value of the arc is determined from the differences between the angles measured by the compasses between the tangent to the cable and the fixed and known direction. The positions of the detectors along the cable are then determined by interpolation between the positions of the compasses along the cable.

SUMMARY OF THE INVENTION

In accordance with the present invention there is provided a system for determining the position in X-Y coordinate a plurality of points along a cable towed by a marine vessel and for visually displaying such points for use by the vessel's operator in steering the vessel past other vessels or obstacles.

In the development of marine exploration, the seismic detector cables have become quite long, extending for one mile, two miles, or even farther behind the marine vessel. Such lengths can cause problems in accurately determining the position and configuration of the cable as it is towed through the water since it is unlikely that cables of such lengths will extend in a straight line behind the towing vessel or even be configured in the shape of a single arc of curvature. Rather, the cable may have one or more inflection points in its curvature and may extend laterally to one or even both sides of the towing vessel simultaneously as illustrated in FIG. 1.

One of the primary concerns in towing such a long and curved cable is in the steering of the towing vessel past other marine vessels or obstacles such as drilling towers, etc., in such a way that the projected path of the cable does not intersect such other vessels or obstacles. This is true not only when the vessel passes such obstacle in a straight line but also when the vessel is in a directional turn. Under certain conditions the vessel could even turn sharply enough to cross the cable itself as it extends one or more miles behind the vessel.

It is therefore a specific aspect of the present invention to provide a system for visually displaying the position of a towed cable for use by the towing vessel's operator. A plurality of sensors are located at select points along the towed cable to provide signals representative of the heading of tangents to the cable at such select points. A sensor located onboard the vessel provides a signal representative of the heading of the vessel itself. A navigational system onboard the vessel provides signals identifying the X-Y coordinate of the vessel. The heading signals from the cable sensors and the vessel sensor along with the vessel's X-Y coordinate signal from the navigational system are used to determine the X-Y coordinates for the cable sensors. A visual display having a matrix of display squares records the X-Y coordinates of the vessel and the cable sensors.

In one aspect of the invention the vessel sensor and the cable sensors are magnetic compasses producing signals representing headings with respect to a direction of magnetic north. In this aspect, there is also included a gyrocompass onboard the vessel for producing a signal representative of the true north heading of the vessel. The magnetic variations of the vessel compass and the cable compasses from true north of the vessel's heading are determined in identifying the X-Y coordinates of the select points along the cable. These X-Y coordinates are displayed in a plus X direction off the stern of the vessel and a plus Y direction off the starboard of the vessel.

In a further aspect, the X-Y coordinates of obstacles in the path of the cable as it is being towed are identified. These X-Y coordinates are entered into the matrix of squares of the visual display along with the X-Y coordinates of the vessel and of the select points along the towed cable as illustrated in FIG. 3.

DESCRIPTION OF THE PREFERRED EMBODIMENT

Figure 1:
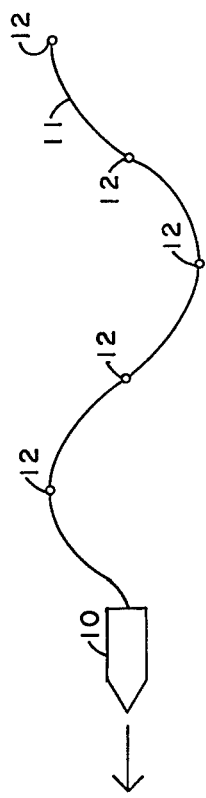
FIG. 1 illustrates a seismic exploration system employing a marine vessel and towed seismic cable.

In seismic marine exploration, the marine vessel 10 of FIG. 1 tows a seismic detector cable 11 along a line of exploration. Such a cable 11 conventionally employs a plurality of detectors, or hydrophones, (not shown) spaced along its length for receiving seismic reflections from the subsurface layer below the ocean floor. The cable also employs a plurality of magnetic heading sensors 12 equally spaced along its length, five such sensors being illustrated in FIG. 1. Each sensor provides a signal representing the magnetic heading or direction of the tangent to that particular point of the cable. By knowing the heading of the tangents to the cable at such plurality of points along the cable and the distances between each of such points, the location of the cable along its entire length can be estimated.

Figure 2:
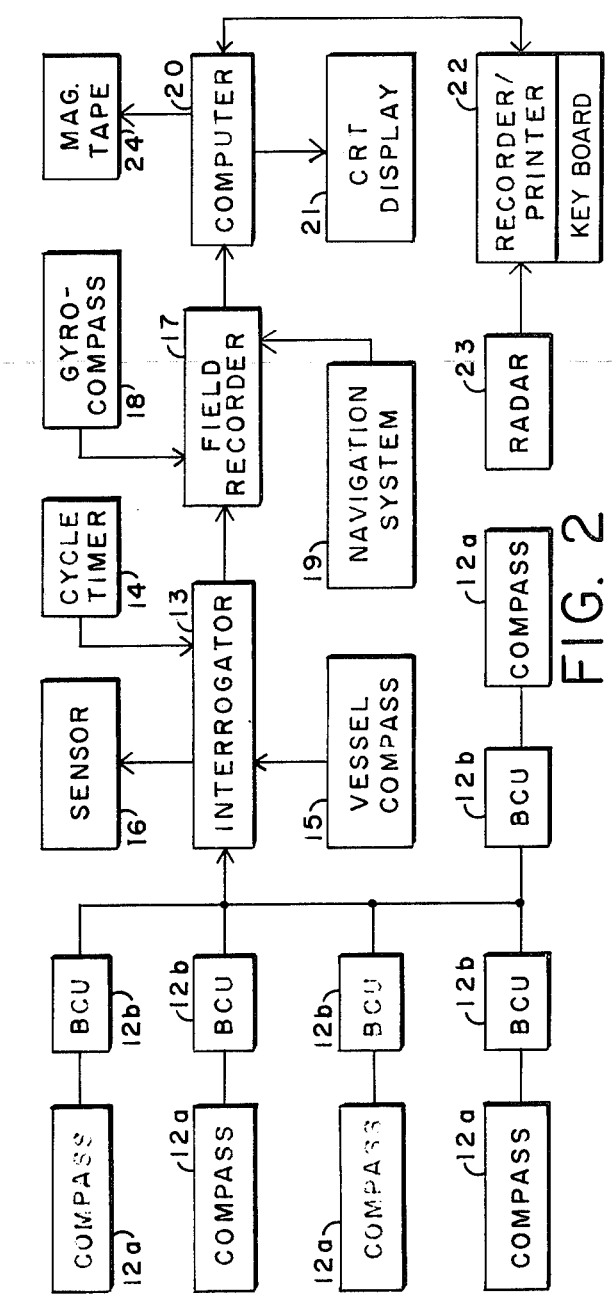
FIG. 2 illustrates seismic recording equipment employed with the marine exploration system of FIG. 1.

In the preferred embodiment, each sensor 12 includes a magnetic compass 12a and a binary control unit 12b. A Model 319 Magnetic Sensor supplied by Digicourse, Inc., is utilized for each magnetic compass 12a, and a Model 350 Binary Control Unit of Digicourse, Inc., is utilized for each binary control unit 12b. The readings of the compasses are multiplexed by the associated binary control units onto a single pair of wires running the length of the cable to the onboard cable location computing system as illustrated in FIG. 2. Each binary control unit is addressed with its appropriate code number by the interrogator 13. A Model 290 Data Acquisition Unit of Digicourse, Inc., is utilized for such interrogator. A start pulse from the cycle timer 14 initiates the multiplexing of the magnetic compass headings to information registers in the interrogator 13. Also applied to an information register in the interrogator 13 is the heading from an onboard magnetic compass 15, such as the Model 101 Magnetic Sensor of Digicourse, Inc. The compass heading in any one of the six information registers can be visually displayed on the sensor display 16, such as a Model 102 Sensor Display of Digicourse, Inc.

The information registers of the interrogator 13 transfer the compass headings to an external header unit in the field recorder 17. Such field recorder is preferably the DFS IV digital field recorder of Texas Instruments Incorporated. Also applied to such external header unit is the true north reading from an onboard gyrocompass 18 and a satellite-positioning reading of latitude and longitude from the onboard navigational system 19. The field recorder 17 therefore contains all the information required by the cable location computer 20 to compute cable position relative to the vessel's gyroheading. Preferably, the computer 20 is the Model 980B of Texas Instruments Incorporated. This computer converts the compass data into X and Y coordinates for recording on magnetic tape unit 24, plus X direction being headed off the stern from the ship and plus Y being starboard from the ship. A simple plot of the ship coordinates and the cable compasses appears on the cathode-ray tube display 21. The computer also provides the bearing and range of each compass with respect to the ship. A zero degree (0°) reference is used for the gyroheading of the ship. Therefore, compass bearings will generally be around 180°. Such bearing and range information are recorded on the recorder 22, preferably a Silent 730 KSR Keyboard Recorder/Printer of Texas Instruments Incorporated.

Having generally described the invention in conjunction with the block schematic of FIG. 2, a more detailed description of the operation of the various units of FIG. 2 will now be described in conjunction with the location of the cable 11 during a towing operation.

During seismic exploration operations, each seismic recording cycle is initiated at time zero by a ground signal of at least 40 milliseconds but not greater than 100 milliseconds from the cycle timer 14. If, however, seismic exploration operations are not being carried out, the ground signal can be supplied to the interrogator 13 from the cable location computer 20. This ground signal is utilized by the interrogator 13 to successively address each binary control unit 12b for 100 milliseconds. It will therefore require 500 milliseconds to read the five cable compasses 12a. The onboard magnetic compass is ready every 25 milliseconds. It requires 60 milliseconds to output the compass readings from the information registers of interrogator 13 to the external header unit of the field recorder 17.

In the field recorder 17, the magnetic differences between the magnetic compass readings and the gyrocompass reading are determined as indications of the magnetic variations of the compass readings from true north of the vessel's heading. The compass readings are then read out of the field recorder 17 and into the cable location computer 20 approximately one second before each firing of the seismic acoustic source and the recording of the resulting seismic reflection data. Approximately 12 seconds are utilized between each such source firing.

Figure 4:
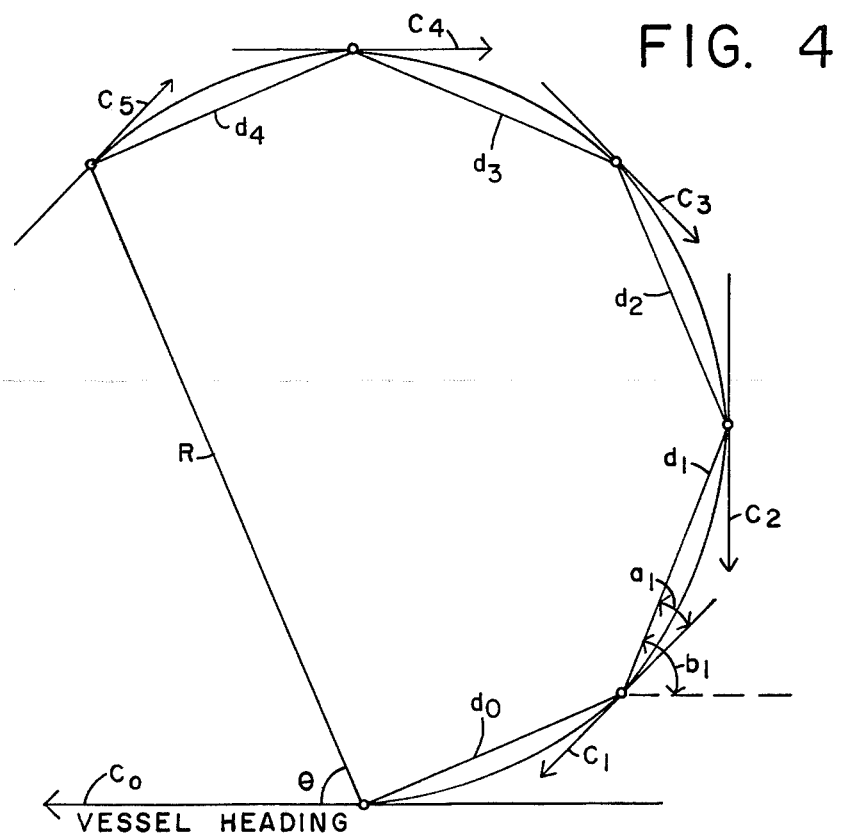
FIG. 4 illustrates the geometric configuration utilized in determining cable compass X-Y coordinates.

Following transfer of the corrected compass headings and the navigation information from the field recorder 17, the computer 20 determines the X and Y coordinates of each compass, with plus X direction being headed off the stern of the ship and plus Y being headed off the starboard of the ship. Also, the bearing and range of each compass with respect to the ship are determined. Such determinations are based upon the theory that when the tangent of a plurality of points along the cable (i.e., as indicated by the compass readings) is known and the distances between such points along the cable are known, then the lengths and directions of the chords between such points can be determined, assuming the cable between such points is an arc of a circle. These chords can then be stacked as a prediction of the cable's position with respect to the vessel's heading as the cable is towed through the water. Such stacking will also yield a single vector indicating the distance of the farthest cable compass from the vessel and the bearing of such compass with respect to the vessel's bearing. Referring more particularly to FIG. 4, there is illustrated an example configuration for a towed cable with respect to vessel heading wherein:

$c_o$ = vessel heading with respect to magnetic north, $c_i$ = cable headings with respect to magnetic north at the select points of the cable compasses (i.e., $c_1$–$c_5$), $d_i$ = chord subtending the arc of curvature of the cable between adjacent compasses (i.e., $d_0$–$d_4$), $a_i$ = angle between the chord $d_i$ and the tangent line for the cable heading $c_i$, $b_i$ = angle between a line pointing in the direction of the vessel's heading and the chord $d_i$, and $s_i$ = cable arc length between adjacent compasses. Each chord $d_i$ defined in the above manner becomes a directed line segment with vector components $X_i$ and $Y_i$. Computation of the distance R and bearing $\theta$ from the vessel to the last cable compass is as follows:

$$a_i = \tfrac{1}{2}(c_i - c_{i+1})$$

$$b_i = a_i + c_0 - c_i$$

$$d_i = (180 s_i / \pi a_i) \sin a_i$$

$$X_i = d_i \cos b_i; Y_i = d_i \sin b_i$$

$$R = \sqrt{(\Sigma X_i)^2 + (\Sigma Y_i)^2}$$

$$\theta = 180° - \tan^{-1}(\Sigma Y_i / \Sigma X_i)$$

Figure 5:
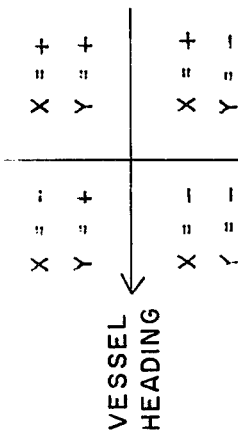
FIG. 5 represents a truth table for locating the bearing of the farthest compass from the vessel.

Examination of the signs $\Sigma X_i$ and $\Sigma Y_i$ gives the bearing $\theta$ with respect to vessel heading as shown in the truth table of FIG. 5.

Figure 3:
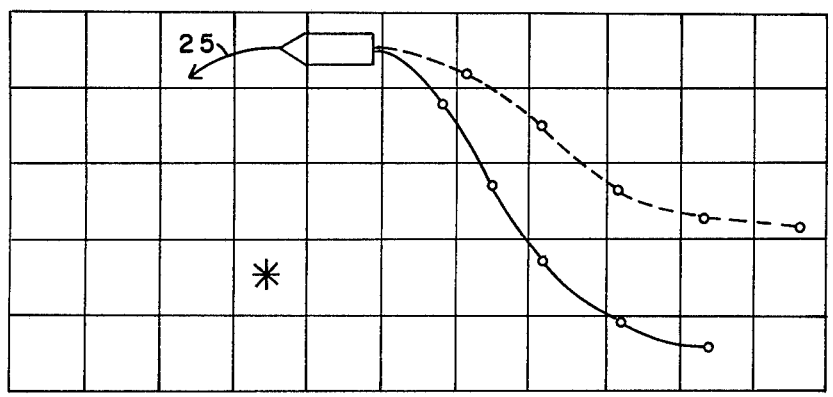
FIG. 3 illustrates a visual display of cable-positioning data determined by the recording equipment of FIG. 2.

A typical plot of such cable location with respect to the ship for the five-compass cable of the preferred embodiment is illustrated in FIG. 3. Such plot is based on a matrix of display squares wherein the entire square in which a determined X-Y coordinate falls is brightened on the face of the cathode-ray tube display 21. This five-point plot of X-Y coordinates is updated prior to each seismic firing cycle or approximately every 12 seconds. Should the vessel change its direction and position as indicated by the arrow 25 in FIG. 3, each compass position is changed to a new X-Y coordinate on the display matrix as indicated by the dashed lines.

In addition to the visual display of the location of the marine vessel and its towed cable, various obstacles that lie in the path of the vessel and its cable, such as other vessels, drilling towers, etc., may also be displayed with their X-Y coordinates. Should the vessel's radar 23 identify a possible obstacle, the vessel's operator may enter the obstacle's X-Y coordinate into the display matrix by means of the input keyboard of the recorder/printer. The display square in which the obstacle's X-Y coordinate falls is brightened on the face of the cathode-ray tube display 21. For example, the square marked with an asterisk, *, in FIG. 3 indicates the position of an obstacle lying in a collision path with the cable.

Various modifications may be made to the foregoing-described embodiment of the present invention without departing from the scope and spirit of the present invention as set forth in the appended claims. For example, in lieu of the use of magnetic compasses for the cable sensors 12a, there may be employed encoding gyros, strain gauges, or even flow sensors connected in bridge circuits to detect such things as pressure or temperature unbalance across the cable. Also, navigational antennas may be located on cable support buoys for sending cable heading signals to the vessel. Further, various types of recording and display equipment may be employed on the vessel for indicating cable location.

I claim:

1. A system for visually displaying the position of a cable towed by a marine vessel, comprising:
   (a) means for providing navigational information signals indentifying the X-Y coordinate of said marine vessel,
   (b) a sensor located on said marine vessel for providing a signal representative of the heading of said marine vessel as it tows said cable through the water,
   (c) a plurality of sensors located at select points along said cable for providing signals representative of the heading of tangents to the cable at said select points,
   (d) means responsive to the signals from said cable sensors, from said marine vessel sensor, and from said navigational information means for determining the X-Y coordinate of each of said plurality of cable sensors,
   (e) a visual display having a matrix of display squares,
   (f) means for entering the X-Y position of said marine vessel along with the X-Y position of said plurality of selected cable points into the matrix of said visual display, whereby squares of the display matrix identified with said entered X-Y positions are visually distinguishable from the remaining squares to display a locus of points defining the configuration of the towed cable,
   (g) means for identifying the X-Y coordinates of obstacles in the path of said cable as it is being towed by said marine vessel, and (h) means for entering the X-Y coordinates of said obstacles into the matrix of said visual display to visually display a mark representing the position of the obstacle relative to the cable.

2. The system of claim 1 wherein said cable sensors and said marine vessel sensor are magnetic compasses.

3. The system of claim 2 further including a gyrocompass on the marine vessel for producing a signal representative of the true north heading of said marine vessel.

4. The system of claim 3 further including means for determining the magnetic variations of the cable compasses and the marine vessel compass from the true north of said marine vessel's heading.

5. The system of claim 1 wherein the X-Y coordinates of said cable sensors are identified as a plus X direction off the stern of the marine vessel and a plus Y direction off the starboard of the marine vessel.

6. The system of claim 1 wherein said visual display is a cathode-ray tube.

* * * * *